(12) United States Patent
Drago et al.

(10) Patent No.: US 8,424,674 B2
(45) Date of Patent: Apr. 23, 2013

(54) SLAT CONVEYOR WITH FIXED AND MOVABLE SLATS

(75) Inventors: James P. Drago, Metolius, OR (US); Daniel W. Jackson, Redmond, OR (US)

(73) Assignee: Keith Manufacturing Co., Madras, OR (US)

( * ) Notice: Subject to any disclaimer, the term of this patent is extended or adjusted under 35 U.S.C. 154(b) by 14 days.

(21) Appl. No.: 12/380,389

(22) Filed: Feb. 26, 2009

(65) Prior Publication Data

US 2010/0213035 A1 Aug. 26, 2010

(51) Int. Cl.
*B65G 25/06* (2006.01)
*B65G 25/04* (2006.01)

(52) U.S. Cl.
USPC .................................. 198/750.3; 198/750.2

(58) Field of Classification Search .................. None
See application file for complete search history.

(56) References Cited

U.S. PATENT DOCUMENTS

| | | | | |
|---|---|---|---|---|
| 5,419,426 A | * | 5/1995 | Foster | 198/750.4 |
| 2008/0023300 A1 | * | 1/2008 | Foster | 198/750.3 |

* cited by examiner

*Primary Examiner* — Kavel Singh
(74) *Attorney, Agent, or Firm* — Bruce A. Kaser

(57) ABSTRACT

Movable conveyor slats (12) have side parts (74, 76) which rest on top parts of bearings (92). The bearings (92) have a generally U-shaped cross section and they fit on wings (52, 54, 54') which extend outwardly and slope upwardly from the sides of a fixed conveyor slat (10, 10'). Fixed conveyor slats (10, 10') have base portions (18, 18') and upper insert portions (20, 20'). The inserts (20, 20') have downwardly extending ribs (62, 64) on their sides which extend into upwardly opening grooves (48, 50) in the base portions (18). The movable slats (12) have web (80, 82) and lower flange portions (84, 86) which with the side parts (74, 76) of the slats (12) form laterally outwardly opening channels. The wings (52, 54, 54') and the bearings (92) are received within the channels (88, 90).

3 Claims, 3 Drawing Sheets

SLAT CONVEYOR WITH FIXED AND MOVABLE SLATS

TECHNICAL FIELD

This invention relates to improvements in slat conveyors composed of fixed and movable slats. More particularly, it relates to an improved construction of the fixed slats making it relatively easy to install the fixed slats on a base structure.

BACKGROUND OF THE INVENTION

U.S. patent application Ser. No. 12/221,295, filed Aug. 7, 2008, and entitled Reciprocating Slat Conveyor With Moving Slats Between Fixed Slats discloses a conveyor which is in substance like the conveyor of this invention except for the construction of the fixed slats. The contents of Ser. No. 12/221,295 are incorporated herein.

Reciprocating slat conveyors comprise elongated conveyor slats which form the floor of a trailer or other container. One form of known reciprocating slat conveyor is composed of alternating fixed slats and intermediate movable slats. Typically, this type of conveyor has upwardly concave fixed slats and upwardly convex movable slats. Material deposited on the conveyor slats is moved by the movable slats. The material that is on the fixed slats between the movable slats is moved along with the material that is moved by the movable slats. The material between the movable slats becomes interlocked with the material on the movable slats, causing it to move with the material on the movable slats.

The fixed slats of the conveyor are installed first on a support structure and then the movable slats are installed on the fixed slats. There is a need for facilitating the procedure of mounting the fixed slats on the support structure, including the use of fasteners that can be installed from above. The primary object of the present invention is to fill these needs.

BRIEF SUMMARY OF THE INVENTION

The improved conveyor of this invention comprises a plurality of laterally spaced apart, laterally extending, fixed conveyor slats. It also comprises a plurality of laterally spaced apart, longitudinally extending, movable conveyor slats. Each of the movable conveyor slats is positioned laterally between a pair of fixed slats. The fixed slats have a unique construction. Except for two fixed slats at the two sides of the conveyor, each of the fixed slats include a base having a bottom and two spaced apart side parts connected to and extending upwardly from the bottom. Wings extend upwardly and laterally outwardly from the side parts of the base. There is an open space between the side parts and above the center of the bottom. This allows access to the bottom of the base from above the slat. Each side part of the base has a top portion comprising an inner part and an outer part spaced outwardly from the inner part. The inner and outer parts extend longitudinally of the fixed conveyor slat. Each fixed slat also has a longitudinally extending insert positionable between the wings. Each insert has a pair of side parts and a center part between the side parts. The side parts of the insert sit down onto the top portions of the side parts of the base.

In preferred form, the top portions of the side parts of the base include upwardly opening, longitudinally extending recesses. Preferably, the side parts of the insert are received in the recesses.

A further preferred feature is the provision of longitudinally extending grooves in the recesses, and the provision of longitudinally extending, downwardly directed ribs on the insert. Each rib is sized and shaped to fit within the groove in the top portion of its side part of the base.

This construction of the fixed slat makes possible the provision of fastener-receiving openings in the bottom of the base, between the side part of the base, usable for receiving fasteners for securing the base to a structure below the base.

Additional features, objects and advantages of the invention will become apparent from the description of the embodiments and principles that are described below.

BRIEF DESCRIPTION OF THE SEVERAL VIEWS OF THE DRAWINGS

Like reference numerals are used to designate like parts throughout the several views of the drawings, and.

DETAILED DESCRIPTION OF THE ILLUSTRATED EMBODIMENT

The aforementioned U.S. application Ser. No. 12/221,295 illustrates a reciprocating slat conveyor having laterally spaced apart, longitudinally extending, fixed and movable conveyor slats, all of which extend the full length of the conveyor. In a typical conveyor, the slats may be about forty feet in length. The fixed slats are laterally spaced apart and the movable slats are laterally spaced apart. Each movable slat may be between two adjacent fixed slats. A typical conveyor may comprise thirty-six slats, eighteen fixed slats and eighteen movable slats. However, the length and width of the conveyor and the number of slats can vary.

Figure 1:
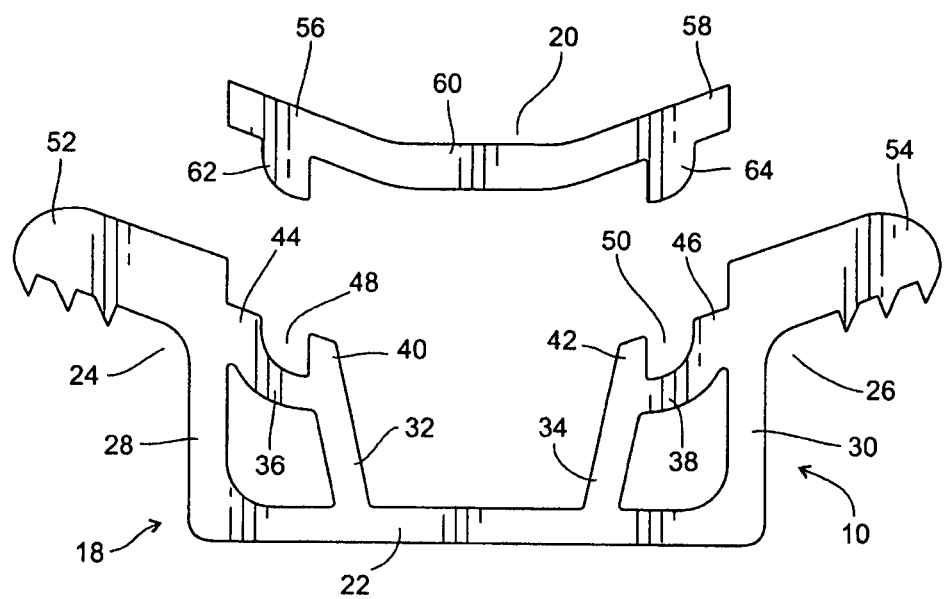
FIG. 1 is an exploded end view of a two-part fixed slat, such view showing a central insert part spaced above a base part.
Figure 2:
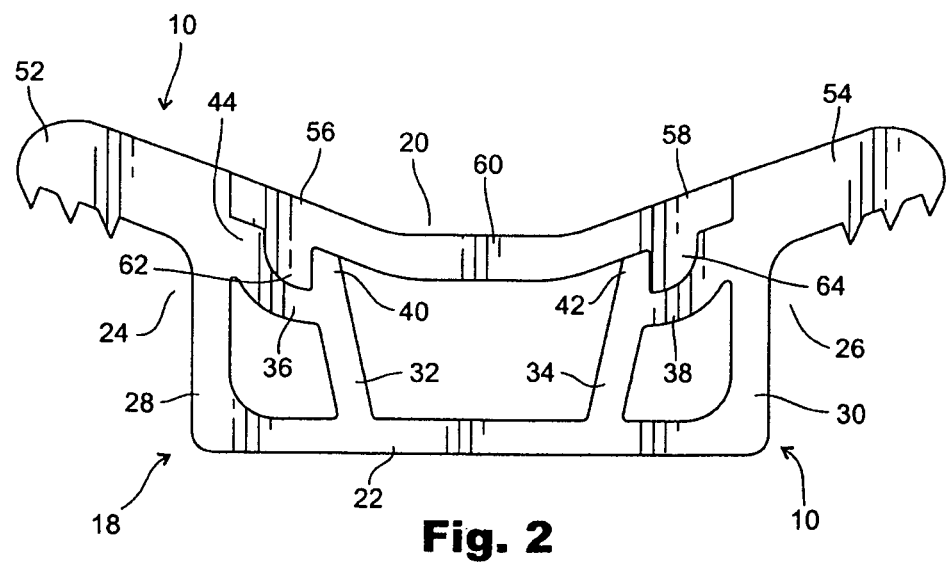
FIG. 2 is a view of the parts of FIG. 1 in an assembled condition.
Figure 3:
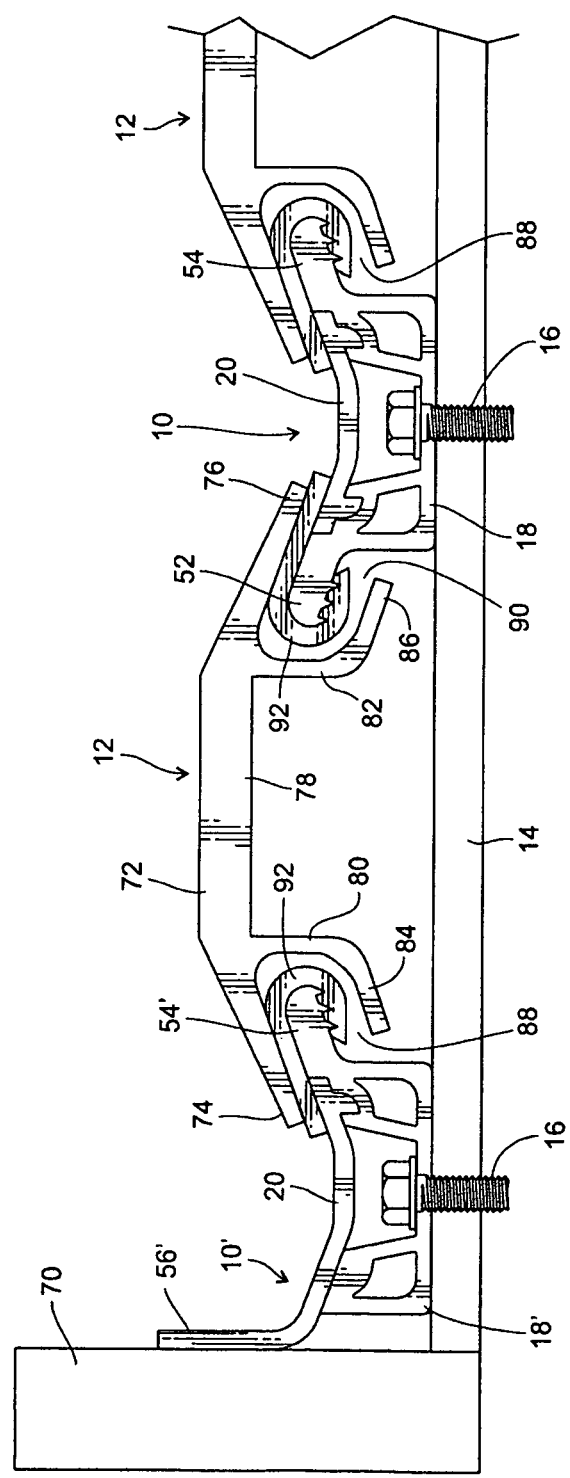
FIG. 3 is a fragmentary end view of a reciprocating slat conveyor that includes the fixed slat construction shown by FIGS. 1 and 2.

FIGS. 1-4 herein show a conveyor that is basically like the conveyor disclosed in Ser. No. 12/221,295. It is composed of laterally spaced apart fixed conveyor slats 10 and laterally spaced apart movable conveyor slats 12. The movable slats 12 may be like the movable slats in Ser. No. 12/221,295. The fixed slats 10 are in some respects like the fixed slats in Ser. No. 12/221,295. They differ in the way that they are mounted and the way that they are constructed in order to facilitate the mounting. Referring to FIG. 3, the fixed slats 12 are shown to be connected to a base 14 by bolts or screws 16. Bolts 16 are pictured in FIG. 3. When I-beams are used for the substructure (FIG. 4) self-tapping screws can best be used to connect the bottom 22 to the upper flange of the beam 14.

Referring to FIGS. 1 and 2, the fixed conveyor slats 10 are shown to comprise a base 18 and a top insert 20. The base 18 comprises a bottom 22 and two spaced apart side parts 24, 26. The side parts 24, 26 are connected to the bottom 22 and extend upwardly from the bottom 22. Side parts 24, 26 may comprise outside walls 28, 30 and inside walls 32, 34. The outside walls 28, 30 extend upwardly from the outside boundaries of the bottom 22. The inside walls 32, 34 extend upwardly from central regions of the bottom 22. The side parts 24, 26 include top portions 36, 38, composed of inner parts 40, 42 and outer parts 44, 46. The inner and outer parts 40, 42 and 44, 46 extend longitudinally of the base 18 and are separated by longitudinally extending grooves 48, 50. The fixed slats 18 also include a pair of opposite side wings 52, 54 that extend upwardly and laterally outwardly from the side parts 24, 26. The fixed slat 18 includes a longitudinally extending top insert 20 that is positionable between the side parts 24, 26 of the base 18. The insert includes side parts 56, 58 connected by a center part 60. Longitudinal ribs 62, 64 may project downwardly from the side parts 56, 58 of the insert 20. The ribs 62 are sized and shaped to fit within the grooves 48, 50, as shown by FIG. 2. These ribs 62, 64 also add structural support between wings 52, 54.

Figure 4:
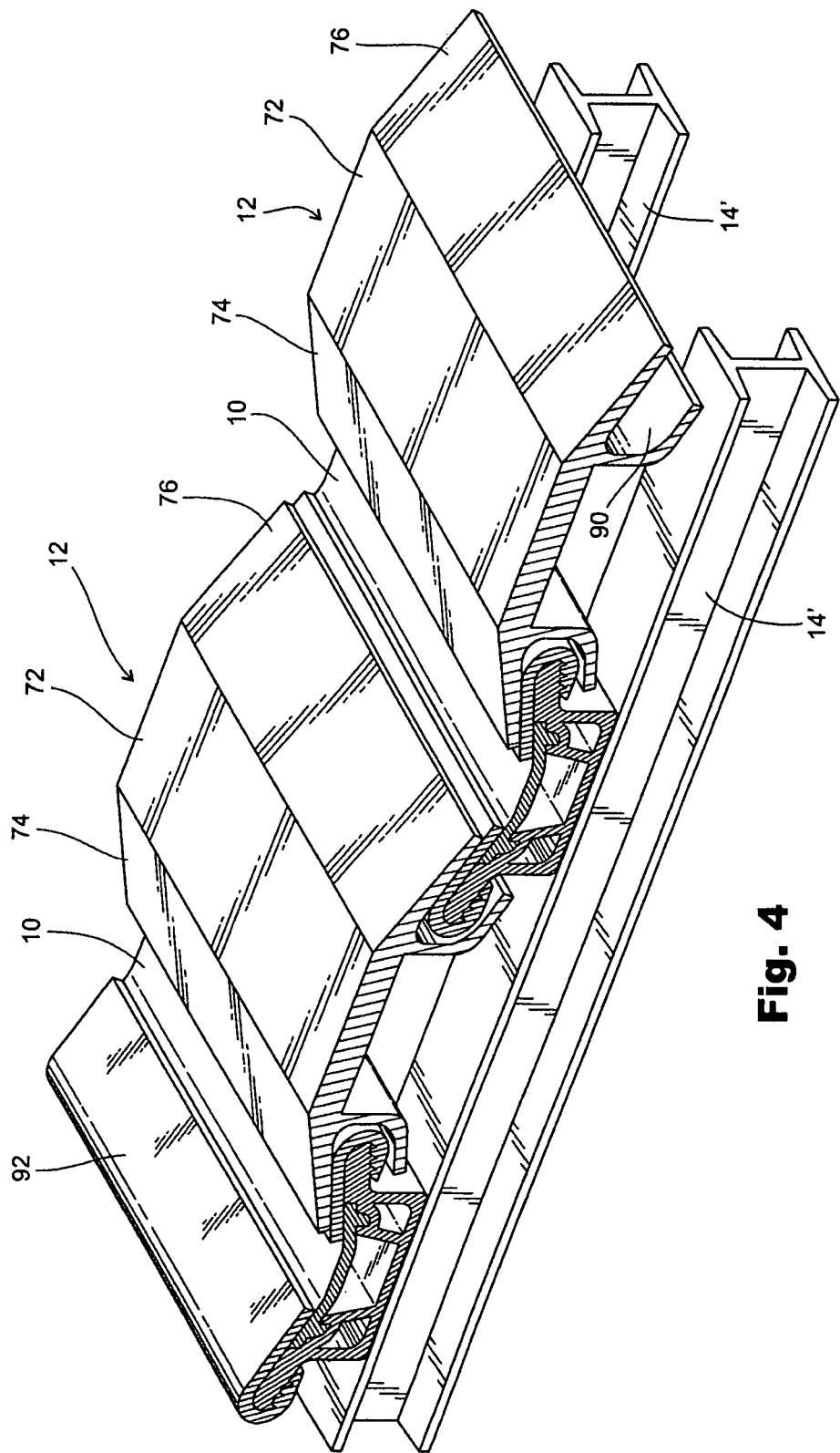
FIG. 4 is a fragmentary pictorial view of the conveyor shown by FIG. 3, showing the fixed and movable slats of the conveyor in cross section.

FIG. 3 shows the mounting bolts 16 extending downwardly through openings in the central portion of the bottom 22. The bases 18 of the fixed slats 10 are set down onto a base member (FIG. 3) or cross members 14' (FIG. 4). The bolts 16 are then inserted down through openings in the bottom 22 and are screwed into the base member 14. Then, the insert 20 is installed and may be attached to the base 18. The insert 20 is designed to be removable from the base 18 for different reasons. First, removing the insert provides access to the bolts 19 for removing the slat installation or repair. Second, the insert 20 may be replaced due to wear, as needed. The insert 20 may also be made of a different material (e.g. high density plastic relative to other parts).

Referring to FIG. 3, the particular fixed slat 10 that is shown by and described in conjunction with, FIGS. 1 and 2 is positioned between adjacent movable slats 12. Fixed slats 10' of a modified construction are used at the two sides of the conveyor where the conveyor meets the side walls of the container in which the conveyor is situated. As shown by FIG. 3, fixed slat 10' is like slat 10 but minus one wing. Also, the insert 20 has a left side 56' that bends upwardly against container side wall 70. The same fixed slat 10' is used on the opposite or right side of the conveyor. However, it is turned end-for-end so that the wing 54' is on the left side of the fixed slat 10' and the upstanding side portion 56' is on the right side of the slat 10', against the right side wall (not shown).

The movable slats 12 may be like the movable slats that are disclosed in Ser. No. 12/221,295. Referring to FIG. 3, the movable slat 12 has a top section 72 composed of side parts 74, 76 and a central part 78. As clearly shown by FIG. 3., the movable slat 12 has a laterally outwardly opening channel shaped portion on each of its sides. The side portions 74, 76 of the top 72 form upper flanges 74, 76. A pair of webs 80, 82 extend downwardly from the top section 72, and curve outwardly to form a pair of lower flanges 84, 86. Outwardly opening channel spaces 88, 90 are defined by and vertically between the flanges 74, 84, and 76, 86. The inner boundaries of the channel spaces 88, 90 are closed by the webs 80, 82. The web 80 and the flange 84 form a downwardly and outwardly extending hook on their side of the slat 12. The web 82 and flange 86 form a downwardly and outwardly extending hook on their side of the slat 12. The bottom surface of flange 74 and the top surface of flange 84 slope downwardly as they extend outwardly. In similar fashion, on the opposite side of the slat 12, the lower surface of flange 76 and the upper surface of flange 86 slope downwardly as they extend outwardly from the web 82. This results in two channel spaces 88, 90 sloping downwardly and outwardly. In addition to forming the hooks, the webs 80, 82 and the flanges 84, 86 strengthen the slat 12 as a structural member.

As disclosed in application Ser. No. 12/221,295, each of the wings 52, 54, 54' receive a bearing 92 that has a U-shaped cross sectional configuration. The bearings 92 have a top part that sits down on the top of the wings 52, 54, 54' and a bottom part that presses upwardly against the bottoms of the wings 52, 54, 54'. The bearings 92 are constructed form a self-lubricated plastic material. The lower surfaces of the upper flanges 74, 76 of the side parts of the slats 12 rest on the upper surfaces of the bearings 92. When a movable slat 12 is on its fixed slat 12, 12', there is supporting contact between the lower surfaces of slat side parts 74, 76 and the upper surfaces of the bearings 92. The bight of the bearings 92 are sideways contiguous with the outer surfaces of the webs 80, 82. The lower part of the bearings 92 are contiguous with the upper surfaces of the flanges 84, 86. If a slat should slide sideways, the leading web 80, 82 will contact the bight of the bearing 92 that it confronts. If the slat 12 should move upwardly for any reason, its lower flanges 84, 86 will contact the lower surfaces of the bearings 92.

In preferred form, the fixed slats 10,10' and the movable slats 12 are extrusions made from a suitable aluminum alloy. Of course, they can be made of other metals and can be made from various plastic and composite materials as well.

As clearly shown by FIG. 3, when the bearings 92 are installed, their upper parts overlap the side parts of the inserts 20. Then, when the movable slats 12 are installed their side parts press downwardly on the bearings 92, firmly holding them in place. Because of this construction, the inserts 20 are held in place relative to the base 18. They are prevented from lifting upwardly off of the base 18 by the bearings 92 and the movable slats 12, until these items are removed for repair purposes.

The illustrated embodiment is only an example of the present invention and, therefore, is non-limitive. It is to be understood that many changes in the particular structure, materials and features of the conveyor slats and bearings may be made without departing from the spirit of the invention. Therefore, it is our intention that our patent rights not be limited by the particular embodiment that is illustrated and described herein, but rather is to be determined by the claims which follow, interpreted in accordance with the established rules of patent claim interpretation.

What is claimed is:

1. A reciprocating slat conveyor, comprising:
   a plurality of laterally spaced apart, longitudinally extending, fixed conveyor slats;
   a plurality of laterally spaced apart, longitudinally extending, movable conveyor slats, each said movable slat being positioned laterally between a pair of said fixed slats;
   each said fixed slat including a bottom and two spaced apart side parts connected to and extending upwardly from said bottom, and wings extending upwardly and laterally outwardly from said side parts, said base and side parts defining an upwardly opening fastener space to provide fastener access for a fastener that connects said bottom of said fixed slat to an underlying support, said fastener extending through said bottom;
   each said fixed slat having a longitudinally extending, removable insert positioned between the wings, each said insert closing said fastener space, and wherein, said insert cooperates with said wings to define a contoured top surface from wing-to-wing across the insert, with the insert defining a valley region of the contoured surface relative to the wings above the fastener position.

2. A fixed slat for a reciprocating slat conveyor, comprising:
   a bottom and two spaced apart side parts connected to and extending upwardly from said bottom, for defining an upwardly opening space to provide fastener access for a fastener to connect the bottom to an underlying support, said fastener extending through said bottom, and wings extending upwardly and laterally outwardly from said side parts; and a removable insert closing the upwardly opening space, said removable insert cooperating with said wings to define a contoured top surface from wing-to-wing across said insert, with said insert defining a valley region of the contoured surface relative to the wings above the fastener position.

3. The fixed slat of claim 2, wherein said two spaced apart side parts each include a longitudinal groove, thereby defining a pair of grooves in said fixed slat, and said removable insert includes a pair of downwardly projecting longitudinal ribs that are shaped to fit within said pair of grooves.

* * * * *